April 30, 1957 J. C. WARD 2,790,854
VARIABLE MU WIDEBAND AMPLIFIER
Filed April 3, 1952 2 Sheets-Sheet 1
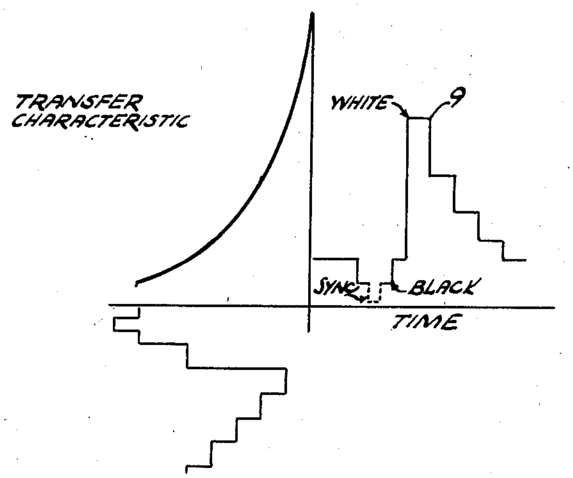
FIG. 1
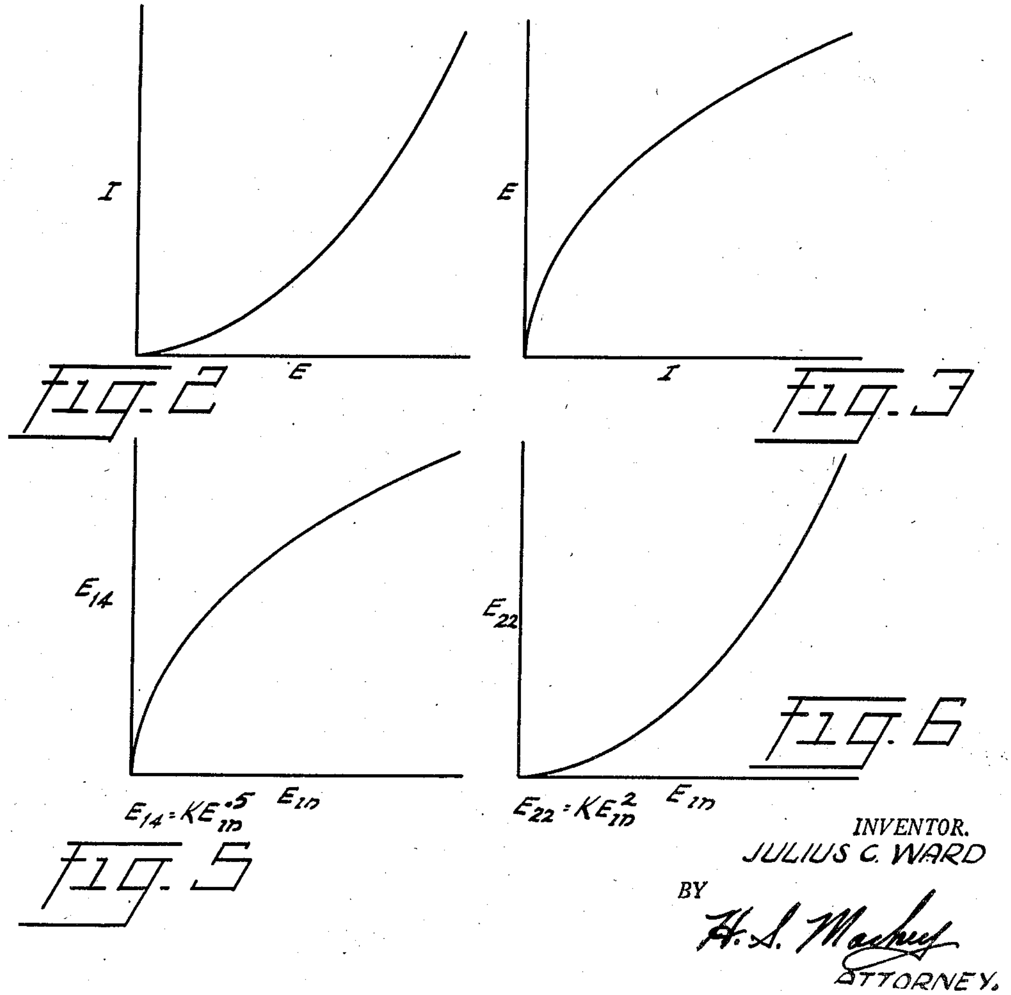
FIG. 2, FIG. 3, FIG. 6
FIG. 5
INVENTOR.
JULIUS C. WARD
BY H. S. Mackey
ATTORNEY.

VARIABLE MU WIDEBAND AMPLIFIER

Filed April 3, 1952 2 Sheets-Sheet 2

INVENTOR.
JULIUS C. WARD

BY H. S. Mackey

ATTORNEY.

United States Patent Office 2,790,854 Patented Apr. 30, 1957

2,790,854

VARIABLE MU WIDEBAND AMPLIFIER

Julius C. Ward, Pleasantville, N. Y., assignor to General Precision Laboratory Incorporated, a corporation of New York Application April 3, 1952, Serial No. 280,225

6 Claims. (Cl. 179—171)

This invention relates to an amplifying system for handling a very wide band of frequencies in which the relative expansion and/or compression of the different levels of input signals can be readily varied at will.

The invention has general application but is particularly adapted to and is illustrated in connection with the control of the contrast or "gamma" of television picture signals. The system may be used in a television receiver or may be used anywhere in a television "chain," which may be said to extend from the "live" scene to the final reproduced picture, whether the video signals are transmitted to the receiver directly through an electronic link or through an intermediate recording stage.

The primary motivating factor behind the present invention is the need for overcoming or compensating for the non-linear transfer characteristic in any television chain due primarily to inherent characteristics in the components of the chain.

The degree of faithfulness with which a picture of a live scene is reproduced depends upon two primary factors, namely, general brightness or background and contrast of the incremental areas. The contrast range of a reproduced picture is the range of brightness between the lightest and darkest portions of the picture. Since the sensation of light in the human mind, that is, the eye response, is approximately proportional to the logarithm of the brightness, contrast range is commonly expressed in terms of the ratio between the brightest portion and the darkest portion.

Most light-to-signal and signal-to-light transducers used in video systems do not accurately reproduce the gray scale or tonal quality of the original scene. The effect, generally described as either compression of the whites or compression of the blacks, is due to an inherent non-linearity in the input versus output response. The present invention is capable of correcting this condition by providing means for variably providing the necessary compensation to obtain a net overall linear relation. The system is also capable of selectively providing compression of either the whites or the blacks in the event it is desired to obtain a specific non-linear relation to compensate for some non-linearity in some associated circuit or transducer element. To this extent the invention provides very wide flexibility of operation.

Since the system necessarily has different amplification factors for signals of different amplitudes, preferably a selected amplitude level is utilized as a reference level with respect to which either compression of the high and expansion of the low amplitude signals or expansion of the high and compression of the low amplitude signals takes place so that the amplitude of the composite signal will be substantially constant. Preferably, the system is adjusted for unity gain at the maximum white level, although if desired, any other signal level and gain could be used as a reference.

Heretofore, systems to accomplish similar results have been proposed using two separate channels having non-linear transfer characteristics. In such systems it is necessary to provide separate means in each channel for maintaining the same signal reference level as well as a precisely fixed phase relation between the signals in the two channels. The disadvantages of such systems are obvious.

Accordingly, a primary object of the present invention is to provide an improved system for readily varying the relative compression or expansion of high and low amplitude signals.

Another object is to provide an improved amplifier for controlling the contrast or "gamma" of television pictures.

Other and further objects will become readily apparent from the following description when considered in connection with the accompanying drawings in which:

Figure 1 illustrates the manner in which a circuit having an exponential transfer characteristic may be utilized to effect relative compression or expansion of signals of different amplitudes, an exaggerated "stepped" form of video signal being used in the illustration;

Figure 2 is a curve similar to the curve in Fig. 1 representing the exponential voltage-current characteristic of a non-linear resistance element, such as a crystal diode, with the voltage plotted as the independent variable;

Figure 3 is a curve representing the current-voltage characteristic of a similar non-linear resistance element, with the current plotted as the independent variable;

Figure 5 is a graphical representation of the transfer characteristic of circuit 11 (Fig. 4); and Figure 6 is a graphical representation of the transfer characteristic of circuit 12 (Fig. 4).

Figure 4:
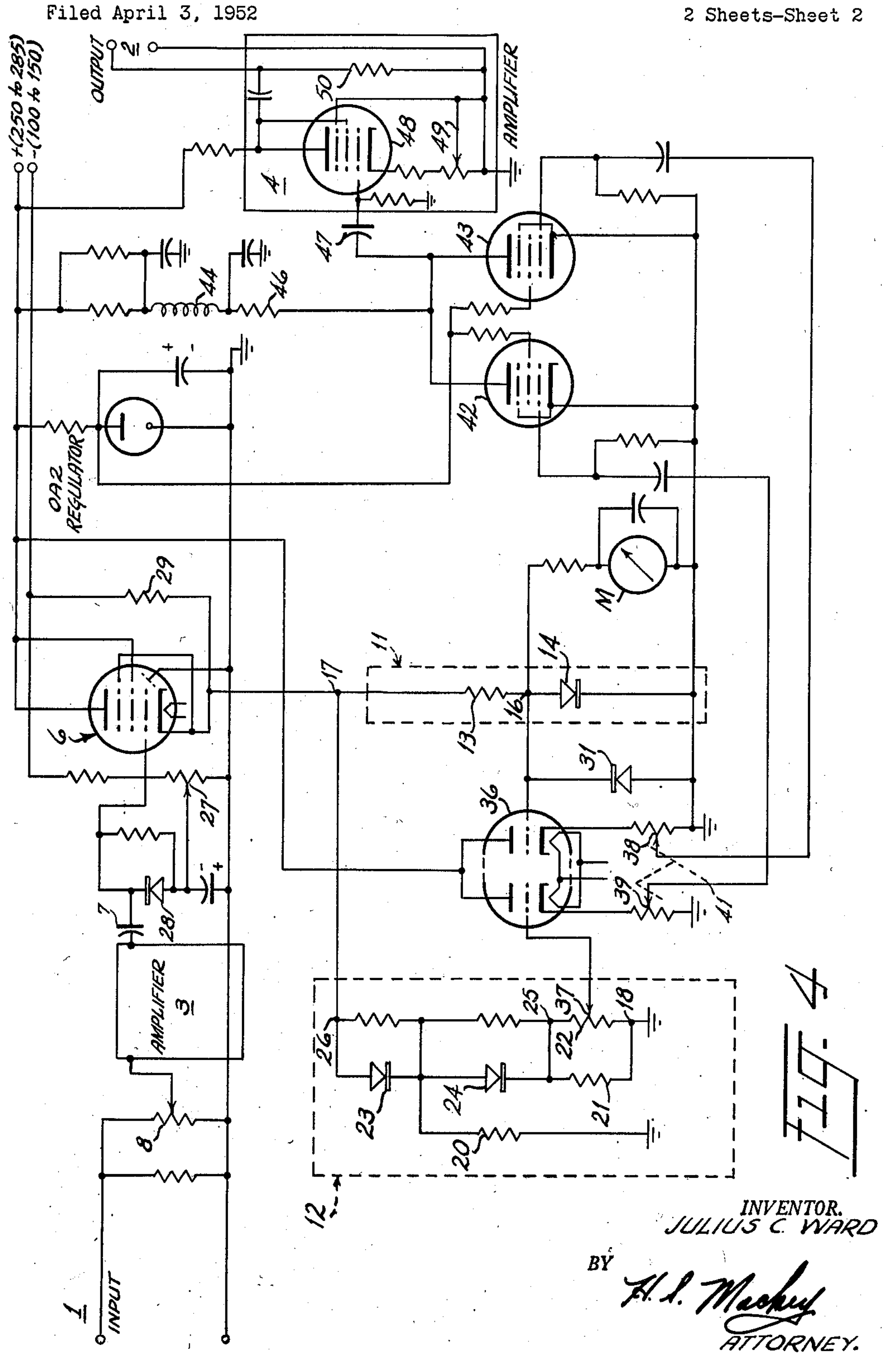
Figure 4 is schematic circuit diagram of an embodiment of the invention.

The present invention takes advantage of the fundamental fact that the direction of curvature, i. e., whether concave up or down, of a non-linear characteristic curve may be reversed by changing the independent variable. This principle is utilized in connection with the exponential relation between the current and potential drop in a non-linear resistance. In the embodiment illustrated, the non-linear resistance is a crystal diode although if desired, other types of non-linear resistances may be used, including electron discharge tubes.

By referring to the foregoing remarks and to the graphs of the drawings, the electronic simplicity and advantages of the invention will be readily apparent.

However, as in most electrical circuits, the dynamic characteristics vary from the theoretical and it is therefore necessary to make certain compensations to attain the theoretical conditions.

To this end, the present invention provides novel circuitry, as shown in Fig. 4, to effect the theoretical conditions in the manner hereinafter described.

Fundamentally, the present invention provides a non-linear amplifier which receives an input signal, such as a video signal, and produces an output signal which has a selected exponential relation with respect to the input signal such that $$E_o = C(E_i)^K \qquad (1)$$

where $E_i$ is the input voltage, $E_o$ is the output voltage, K is an exponent and C is a proportionality, or gain, constant. Means are provided for varying the exponent K over a range of from approximately 0.5 to 2.3 without any change in the amplification of the reference level signal amplitude, preferably chosen at maximum white level. Preferably the amplifier system is adjusted for unity gain at the maximum white level with the proportionality constant C at unity value. As previously suggested the gain of the amplifying system at the white level could be other than unity, if so desired, and the system can be used for audio as well as video signals. When used for video signals the exponent K corresponds to the "gamma" of a photographic transfer characteristic, which may be defined as the relation between the log of the exposure and the resulting density of the film.

Referring to Fig. 4, the embodiment chosen for purposes of illustration comprises an amplifying system having a wide, flat frequency-response range particularly adapted for video signals and having an input circuit 1 and an output circuit 2. Interposed between the input and output circuits are a conventional pre-amplifier 3 and an output amplifier 4 with interconnecting circuits including novel features for effecting the objects of the invention.

The pre-amplifier 3 preferably comprises two conventional stages having a flat response over a range of approximately ten megacycles, the output of which drives a cathode follower amplifier 6 through the coupling condenser 7. The input circuit 1 is provided with a gain control 8 in the form of an input terminating potentiometer which also provides an adjustment for the amplifier gain and the maximum amplitude of the video signals supplied to the cathode follower 6.

The form of the video input signal supplied to the input circuit 1 is illustrated in Fig. 1 with the "whites" or highlights, at high amplitude and the "blacks" or shadows, at low amplitude in the waveform 9. Although the actual video signal is of the normal type, the waveform 9 is shown as a stepped curve in order that subsequent changes in the curve, one type of change being illustrated by the dotted curve, may be conveniently represented.

As is well known, in a cathode follower, the output voltage "follows" the grid input voltage and is of the same polarity. Taking advantage of this characteristic of a cathode follower, the cathode circuit of tube 6 includes two parallel branch circuits designated by the respective dotted-line boxes 11 and 12.

As later described these branch circuits have respective transfer characteristics as indicated in Figs. 5 and 6, one being substantially the inverse of the other. The branch circuit 11 includes a linear resistor 13 whose resistance is very large as compared to the resistance of a non-linear resistor 14 in series therewith. As an example of the relative values the resistor 13 preferably has a resistance six to eighteen times the value of the resistor 14. The exact values are not critical, it being necessary only that the relative values be such that the current through the circuit 11 be substantially independent of the non-linear characteristic of the non-linear resistor 14. Under this condition, the current through the non-linear resistor 14 has a linear relation with respect to the input voltage supplied to the input circuit 1, it being assumed of course that the pre-amplifier 3 has a linear characteristic.

As will be subsequently explained in further detail, the characteristics of the non-linear resistor 14 may be so chosen that the potential at the terminal 16 will vary in an exponential relation with respect to the potential at terminal 17 in the manner illustrated in Fig. 5 while the same or similar type non-linear resistors in the branch circuit 12 will produce an exponential potential variation between the terminal 25 and ground terminal 18, as represented in Fig. 6. By combining these potential variations in a selected manner the overall relation between the input signals at input 1 and the output signals at output 2 can be readily varied.

In the branch circuit 12, the terminating linear resistors 20, 21 and 22 are small compared to the non-linear resistors 23 and 24 so that the voltage across 23 and 24 is approximately equal to the voltage from 26 to ground 18. The current through the non-linear resistors 23 and 24 has the exponential relationship shown in Fig. 2, and the potential drop across the linear resistors 21 and 22, is proportional to this exponential current. From Fig. 4, it is obvious that the input potential at terminal 26 of the branch 12 is identical with that of the terminal 17 of the branch 11.

From the above it will be clear that the branch circuits 11 and 12, which are in parallel in the cathode circuit of the tube 6, are so designed that the current through the non-linear resistor 14 is proportional to the potential at the terminals 17 and 26 while the current through the non-linear resistors 23 and 24 varies directly with the non-linear characteristics of the latter.

In the preferred form of the invention the non-linear resistors 14, 23 and 24 are diodes, such as germanium crystals. It is characteristic of these crystals to have a voltage drop which is approximately proportional to the square root of the current passing through it. From what has been said above it follows that the potential drop across the diode 14, that is, the potential of terminal 16, is proportional to the square root of the voltage at terminal 17. The response characteristic may be expressed mathematically as $$E_{14}=CE^{1/2} \qquad (2)$$

where $E_{14}$ is the potential across diode 14, C is a constant and E is the input voltage applied to the input circuit 11, and is graphically represented in Fig. 5.

By similar reasoning, the potential drop across the two linear resistors 21 and 22 in series with the diode 24 is proportional to the current through the diode 24 and because of the diode characteristic is proportional to an exponential function of the applied voltage at terminal 26. Expressed mathematically, the response characteristic would be $$E_{22}=CE_{12}^{2} \qquad (3)$$

where $E_{22}$ is the potential drop across the linear resistor 22, $E_{12}$ is the input voltage applied to the circuit 12, and the graphical representation is shown in Fig. 6.

As will be clear to those skilled in the electronic art, it is usually difficult to provide theoretical conditions, in the present instance, have the characteristic curves of the diodes 14, 23 and 24 pass through zero, because of the voltage and resistance values actually used. Accordingly, it is difficult to obtain a full two-power curve characteristic from one diode and therefore the small linear resistor 20 is used to terminate the diode 23 and the voltage across the resistor 20 is applied across the diode 24. The value of the resistor 20 is of the same order of magnitude as, or smaller than, that of the diodes, 23 and 24. Thus, in a manenr well known the characteristics of the diodes are multiplied. However, because of certain inherent losses the final exponential function is not a full multiple of the exponential characteristics of each of the diodes 23 and 24 and accordingly, the response characteristic of circuit 12 has an exponent less than 4 but greater than 2.

In order to obtain the exponential characteristics described above it is necessary that the cathode follower 6 be a direct coupled amplifier capable of producing an output voltage varying from approximately zero to from two to four volts with the zero level firmly clamped to ground. This is accomplished by means of a D.-C. restorer in the form of a crystal diode 28 in the grid circuit of the tube 6 so that the cathode-to-ground voltage of this tube can be adjusted to zero with no signal input.

In order to avoid non-linear operation of the tube 6 over the low level portion of the signal range, a special biasing arrangement is provided in the form of a high value resistor 29 between the cathode and a source of negative potential of from 100 to 150 volts. Ordinary biasing methods for obtaining a zero signal current cannot be used because the output of the cathode follower tube 6 is a direct-coupled circuit. With the cathode of the tube 6 connected through the resistor 29 to the high negative bias potential and with the grid bias adjusted until the cathode is close to zero volts with respect to ground the cathode follower tube 6 will have a plate current of approximately 7.5 milliamperes, which is a satisfactory quiescent current to provide linear operation of the tube. The grid bias on tube 6 can be adjusted by means of the potentiometer 27.

As previously mentioned, the transfer characteristics of the diodes 14, 23 and 24 have desirable exponential transfer characteristics as generally represented in Figs. 2 and 3, but this holds true only if they are operated from approximately zero current or voltage input. If a too large quiescent current flows through the diodes, the effect of adding a constant to a lower-law curve is produced thus causing the characteristic curves to deviate considerably from the desired power-law curve.

Tests have shown that the best non-linear potential characteristic from the low power diode 14 is obtained when the zero-signal D.-C. voltage across the diode is between 0.05 and 0.1 volt.

The diode 31, which is connected in opposition across the low power diode 14 has no effect upon the normal operation of the circuit, but is provided to prevent the cathode of the tube 6 from going appreciably below ground potential in the event of an unusual signal or misadjustment of the grid bias of tube 6 which might allow a signal pulse to drive the cathode of tube 6 below ground if the diode 31 were not present to short circuit negative pulses.

No such problem is encountered in circuit 12 (comprising diodes 23 and 24), since the gain is very low at low signal levels in this circuit.

As is clear from Fig. 4, the outputs from the circuits 11 and 12 are supplied to the dual triode 36, the potential at terminal 16 being impressed on the control grid of one section of the triode and the potential of the slider 37 on the resistor 22 being impressed on the other control grid. The purpose of the slider 37 is to provide means for applying equal input signals to both sections of the dual triode 36.

The two sections of the latter tube are operated as cathode followers having output potential dividers 38 and 39 in the respective cathode circuits to vary the output potentials in opposite directions simultaneously to regulate the relative emphasis of the high and low amplitude signals, that is, in the present instance, the "gamma" of the video signals as explained above. For this reason the arms of the potential dividers 38 and 39 are mechanically connected together, as indicated by the dotted line 41, and constitute the mixer control. In one extreme position the output comprises only the signal through circuit 11, that is, the one having the fractional exponent power characteristic and the other extreme position gives the signal only from circuit 12, that is, the one having greater than unity exponent power characteristic. The intermediate positions of the mixer control represent a composite of signals through both circuits 11 and 12, with the mid-position preferably giving nearly a linear signal characteristic. It is preferable to have the circuit gains so adjusted as to give no change in the maximum white level as the mixer control is adjusted.

The respective potentials on the arms of the potential dividers 38 and 39 are supplied through suitable conventional pentode amplifier tubes 42 and 43, the outputs of which are combined in a common plate circuit which includes a peaking inductance 44 and a resistor 46. Through a coupling condenser 47 the output from this common plate circuit is supplied to a final output amplifier of conventional construction and the final stage of which is a pentode tube 48. The tube 48 is provided with a potential divider 49 in the cathode circuit which serves as an output gain control. The output from the plate of tube 48 is terminated in a low value resistor 50 which constitutes the final output circuit 2.

The basic operation of the invention should be clear from the foregoing description. Because the output of the "low power" circuit 11 has a characteristic represented by the curve in Fig. 5 and the output of the "high-power" circuit 12 has a characteristic represented by the curve in Fig. 6, the final output circuit 2 can be made to have a characteristic which is any desired combination of the two characteristics by adjustment of the mixer control 41 in a manner well understood in the art.

In the present invention, gain has a specific meaning only at maximum white level (corresponding to maximum amplitude signals) because the gain varies with change in level as explained. Therefore, it is necessary to adjust the amplifier for the desired gain for the maximum signal. There are two gain controls, the input control 8 and the output control 49, which are intended to be operated practically independently of each other. The characteristics of the non-linear resistors, that is, the germanium diodes 14, 23 and 24, and the input voltage determine the setting of the input gain control 8, while the output gain control 49 is used primarily to adjust the output a few decibels to provide a standard output voltage of either one or 1.4 volts.

In making the initial adjustments the potentiometer 27 is set so as to give a selected reading on the meter M, connected in parallel with the diode 14, with no signal input. A test signal is then supplied to the input 1 of the system and the input gain control 8 is adjusted to give a voltage of two volts on the cathode of tube 6. The mixer control 41 is rotated to the full counter-clockwise position and the peak output signal for full "low-power" operation is noted with the output gain control 49 set at maximum gain. With this setting an output signal of approximately 2.3 volts should be obtained. The mixer control 41 is then rotated to the full clockwise position for "high-power" operation and the potentiometer 37 is adjusted until the same peak output signal is obtained. The potentiometer 37 is then locked and all future operational balancing adjustments may be made with the input gain control 8. The procedure for using the input gain control 8 to balance the amplifier is to rotate the mixer control 41 back and forth between maximum positions in opposite directions while adjusting the input gain control 8 until equal amplitude of maximum white level signal is obtained at all mixer positions.

It has previously been mentioned that if too large a quiescent current flows through the diodes an effect is produced which is similar to that of adding a constant to a power law curve thereby causing the curve to deviate from the desired form and not to pass through zero. A similar effect will be produced if there is any "black-level setup" in the incoming video signal, that is, if there is a potential in the input signal which corresponds to blacker-than-black. The deleterious effects of this condition can be overcome by the adjustment of the potentiometer 27 to apply the proper bias on the tube 6, so that the latter does not respond to any signals corresponding to blacker-than-black picture elements. The system as described herein is adapted to be inserted in a video chain at a point where there are no synchronization signals, although the basic features of the invention could be utilized in a system adapted to pass synchronization signals.

In the preferred embodiment of the invention referred to herein for purposes of illustration only, the non-linear resistors are germanium diodes but it will be readily apparent that other types of non-linear resistors including electron discharge tubes may be used. Also, it is not necessary that the non-linear resistors have an asymmetrical characteristic.

One of the salient features of the invention is the simplicity from an electronic viewpoint of the parallel branch circuits and the method by which they are energized in such a manner as to facilitate selective compression or expansion, at will, of the signals of the different amplitude levels in order to produce a composite output signal, the amplitude of which is held constant entirely independent of the variation of the amplification of the signals of different amplitude. The invention avoids the difficulties of the prior art in that the signals through the parallel branch circuits will have an absolutely fixed phase and there is no necessity for providing independent signal limiting elements in the separate branches.

The provision of the parallel compression and expansion branch circuits in the cathode circuit of the cathode follower provides a novel combination because the cathode circuit of a cathode follower faithfully follows the input signal to the cathode follower tube and the potential drop in the cathode circuit is substantially independent of any changes in the resistance which necessarily takes place by reason of the special characteristics of the two branch circuits 11 and 12.

Another advantageous feature of the invention is the special means for biasing the cathode follower tube 6 in order to produce a particular desirable operation condition for the parallel branch circuits in which the compression and expansion of the signals takes place.

When the term "amplifier" is used herein it is to be clearly understood that this is not limited to gains greater than unity but is used in its usual sense in the art to include gains of the less than unity where it may be necessary to change the phase of the signals or vary the relation between the current and the voltage in a signal, for circuit-matching purposes.

What is claimed is:

1. In a system for controlling the transfer of signals of varying amplitude, a common input circuit, first and second branch circuits connected in parallel with each other and to said common input circuit, said first branch circuit including a linear and a non-linear resistor in series, the value of the linear resistor being so large as compared to said non-linear resistor that the voltage-current characteristic of said first branch circuit is substantially independent of said non-linear resistor throughout the operating range, said second branch circuit including a linear and non-linear resistor in series, the value of said linear resistor being not greater than that of said non-linear resistor whereby said second branch circuit has a non-linear voltage-current characteristic throughout the operating range, and circuit means for variably combining the potential drop across the non-linear resistor of said first branch circuit and the potential drop across the linear resistor of said second branch circuit into a common output circuit, so as to afford a variably modified overall signal transfer characteristic of the system.

2. In a system for controlling the transfer of signals of varying amplitude, an electron discharge tube operated as a cathode follower and having a control grid, a cathode and an anode, the grid-cathode circuit of said tube serving as a signal input circuit and the cathode circuit serving as the output circuit, said cathode circuit including two parallel branch circuits, one of said branch circuits having a substantially linear overall voltage-current characteristic, and including a non-linear element, the other of said branch circuits having a substantially non-linear overall voltage-current characteristic and including a linear element, and means for variably combining an output voltage from said non-linear element of said first branch circuit with an output voltage from said linear element of said second branch circuit so as to afford a variably modified overall signal transfer characteristic of the system.

3. In a system for controlling the transfer of signals of varying amplitude, an electron discharge tube operated as a cathode follower and having a control grid, an anode and a cathode, the grid-cathode circuit of said tube serving as the signal input circuit and the cathode circuit serving as the output circuit, said cathode circuit including first and second parallel branch circuits, said first branch circuit including a linear resistor element and a non-linear resistor element in series, the value of the resistance of said linear element being so large with respect to the value of the resistance of said non-linear resistor that said first branch circuit has a substantially linear overall voltage-current characteristic throughout the operating range, said second branch circuit including a linear resistor element and a non-linear resistor in series, the value of the resistance of said latter linear resistor being not greater than that of said latter non-linear resistor throughout the operating range whereby said second branch circuit has a non-linear overall voltage-current characteristic and means for variably combining the potential drop across said non-linear resistor element in said first branch circuit with the potential drop across said linear resistor element in said second branch circuit into a common output circuit so as to afford a variably modified overall signal transfer characteristic of the system.

4. In a system for controlling the transfer of signals of varying amplitude, an electron discharge tube operated as a cathode follower and having a control grid, an anode and a cathode, the grid-cathode circuit of said tube serving as the signal input circuit and the cathode circuit serving as the output circuit, said cathode circuit including two branch circuits in parallel having a common input terminal and individual output terminals, each circuit having an exponential signal transfer characteristic between said common input terminal and its individual output terminal throughout the operating range, the characteristic of one of said circuits having an exponential factor less than unity, the characteristic of the other of said circuits having an exponential factor greater than unity, and means for variably combining the output voltages from said branch circuits for varying the overall signal transfer characteristic of said system.

5. In a system for controlling the transfer of signals of varying amplitude, an electron discharge tube operated as a cathode follower and having a control grid, an anode and a cathode, the grid-cathode circuit of said tube serving as the signal input circuit and the cathode circuit serving as the output circuit, said cathode circuit including two parallel branch circuits having a common input terminal and individual output terminals, one of said branch circuits having a signal transfer characteristic between input and output terminals which is substantially the inverse of the transfer characteristic of the other branch circuit throughout the operating range, and means for variably combining the output voltages from said branch circuits for varying the overall signal transfer characteristic of said system.

6. In a system for controlling the transfer of signals of varying amplitudes, an electron discharge tube operated as a cathode follower and having a control grid, an anode and a cathode, the grid-cathode circuit of said tube serving as the signal input circuit and the cathode circuit serving as the output circuit, said cathode circuit including first and second parallel branch circuits, said first branch circuit having a first non-linear and a first linear resistor element in series, a second non-linear and a second linear resistor element in series connected in parallel with said first linear resistor element, said second parallel branch circuit including a third linear resistor element and a third non-linear resistor element in series, the relative values of said linear and non-linear resistors being such that over the operating range said first and second branch circuits have overall voltage-current characteristics which are respectively non-linear and linear, and means for variably combining the potential drops across said second linear resistor element and said third non-linear resistor element into a common output circuit so as to afford a variably modified overall signal transfer characteristic.

References Cited in the file of this patent

UNITED STATES PATENTS

| | | |
|---|---|---|
| 2,135,953 | Weber | Nov. 8, 1938 |
| 2,540,539 | Moore | Feb. 6, 1951 |
| 2,552,588 | Reeves | May 15, 1951 |
| 2,583,345 | Shade | Jan. 22, 1952 |
| 2,610,260 | Moffet | Sept. 9, 1952 |
| 2,672,529 | Villard | Mar. 16, 1954 |